United States Patent
Uyeno et al.

(10) Patent No.: US 11,539,131 B2
(45) Date of Patent: Dec. 27, 2022

(54) OPTICAL TRUE TIME DELAY (TTD) DEVICE USING MICROELECTRICAL-MECHANICAL SYSTEM (MEMS) MICROMIRROR ARRAYS (MMAS) THAT EXHIBIT TIP/TILT/PISTON (TTP) ACTUATION

(71) Applicant: Raytheon Company, Waltham, MA (US)

(72) Inventors: Gerald P. Uyeno, Tucson, AZ (US);
Sean D. Keller, Tucson, AZ (US);
Benn H. Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 310 days.

(21) Appl. No.: 17/001,125

(22) Filed: Aug. 24, 2020

(65) Prior Publication Data
US 2022/0059933 A1  Feb. 24, 2022

(51) Int. Cl.
*G02B 6/28* (2006.01)
*H01Q 3/26* (2006.01)

(52) U.S. Cl.
CPC ......... *H01Q 3/2676* (2013.01); *G02B 6/2861* (2013.01); *H01Q 3/2682* (2013.01)

(58) Field of Classification Search
CPC .................................................. G02B 6/2861
See application file for complete search history.

(56) References Cited

U.S. PATENT DOCUMENTS

| 5,404,375 A | 4/1995 | Kroeger et al. |
| 5,854,702 A | 12/1998 | Ishikawa et al. |
| 6,181,450 B1 | 1/2001 | Dishman et al. |
| 6,271,953 B1 | 8/2001 | Dishman et al. |
| 6,327,063 B1 | 12/2001 | Rockwell |

(Continued)

FOREIGN PATENT DOCUMENTS

| DE | 102011104023.8 B4 | 7/2019 |
| EP | 2667142 A1 | 11/2013 |

(Continued)

OTHER PUBLICATIONS

"U.S. Appl. No. 17/007,917, Notice of Allowance dated Jan. 10, 2022", 14 pgs.

(Continued)

*Primary Examiner* — Joseph L Williams
(74) *Attorney, Agent, or Firm* — Schwegman Lundberg & Woessner, P.A.

(57) ABSTRACT

An optical true time delay (TTD) control device for controllably alters the transit time of an optical beam traveling through the device by using the tip & tilt capability of MEMS MMAs to control the entrance and exit angles to a reflection cavity to coarsely control the path length and transit time and the piston capability to fine tune the path length and transit time. The reflection cavity can be configured in one, two or three dimensions with or without an optically transparent solid medium and using additional MEMS MMAs to provide controllable mirror surfaces within the cavity to enhance dynamic range and tenability. The input MEMS MMA may be "segmented" to re-direct a plurality of channel optical beams from the cavity at the same or different exit angles. The segments may be coated with different AR coatings to provide channel optical beams at different wavelengths.

20 Claims, 6 Drawing Sheets

(56) References Cited

U.S. PATENT DOCUMENTS

| | | |
|---|---|---|
| 6,526,352 B1 | 2/2003 | Breed et al. |
| 6,567,574 B1 | 5/2003 | Ma et al. |
| 6,792,028 B2 | 9/2004 | Cook et al. |
| 6,816,315 B1 | 11/2004 | Ai et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,884,997 B2 | 2/2011 | Goodno |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,364,334 B2 | 1/2013 | Au et al. |
| 8,368,889 B2 | 2/2013 | Schwiegeriing et al. |
| 8,380,025 B2 | 2/2013 | Anderson et al. |
| 8,400,619 B1 | 3/2013 | Bachrach et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 8,995,038 B1 | 3/2015 | Anderson et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 9,946,259 B2 | 4/2018 | Keller et al. |
| 10,062,175 B2 | 8/2018 | Uyeno et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,321,037 B2 | 6/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2010/0030473 A1 | 2/2010 | Au et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki et al. |
| 2012/0155885 A1 | 6/2012 | Hannah et al. |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

"U.S. Appl. No. 17/007,917, Response filed Dec. 1, 2021 to Non Final Office Action dated Aug. 3, 2021", 16 pgs.

"U.S. Appl. No. 17/007,917, Supplemental Notice of Allowability dated Apr. 19, 2022", 2 pgs.

"U.S. Appl. No. 16/871,602, Non Final Office Action dated Nov. 9, 2020", 18 pgs.

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

Anderegg, Jesse, et al., "Coherently Coupled High Power Fiber Arrays", Proc. of SPIE 6102, Fiber Lasers III: Technology, Systems, and Applications 61020U, (2006), 6 pgs.

Augst, S J, et al., "Coherent and spectral beam combining fiber lasers", Proc. SPIE 8237, Fiber Lasers IX: Technology, Systems, and Applications, 823704, (Feb. 13, 2012), 11 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Fan, T Y, "Laser Beam Combining or High-Power, High-Radiance Sources", IEEE Journal of Selected Topics in Quantum Electronics, vol. 11, No. 3, (May/Jun. 2005), 567-577.

Kim, et al., "Demonstration of large-angle nonmechanical laser beam steering based on LC polymer polarization grating", Proc.. of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280x720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Redmond, Shawn, et al., "Active coherent beam combining of diode lasers", Optics Letters vol. 36, No. 6, (Mar. 15, 2011), 999-1001.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

(56) References Cited

OTHER PUBLICATIONS

Siegman, A. E., "Unstable optical resonators for laser applications", Proceedings of the IEEE, vol. 53, Issue 3, (Mar. 1965), 277-287.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

"Mirrorcle Technologies MEMS Mirrors—Technical Overview", Mirrorcle Technologies, Inc., (2018), 7 pgs.

Hacker, Jonathan, et al., "A Ka-Band 3-bit RF MEMS True-Time-Delay Network", IEEE Transactions on Microwave Theory and Techniques, vol. 51, No. 1,, (Jan. 2003), 305-308.

U.S. Appl. No. 17/007,917, filed Aug. 31, 2020, Electronically Steered Inter-Satellite Optical Communication System With Micro-Electromechanical (MEM) Micromirror Array (MMA).

OPTICAL TRUE TIME DELAY (TTD) DEVICE USING MICROELECTRICAL-MECHANICAL SYSTEM (MEMS) MICROMIRROR ARRAYS (MMAS) THAT EXHIBIT TIP/TILT/PISTON (TTP) ACTUATION

BACKGROUND OF THE INVENTION

Field of the Invention

This invention relates, in general, to devices for controlling the delay of light propagation and in particular to the use of Tip/Tilt/Piston (TTP) MEMS MMAs to control such delay in a True Time Delay (TTD) device.

Description of the Related Art

There are numerous applications where it is desirable to have a controllably. adjustable time delay over a beam of light. Unfortunately, controllably altering the time delay of light beams, especially light beams that are encoded with high frequency signals (often extremely high frequencies of 30 GHz or even higher) has proven to be a formidable challenge. For instance, the desired performance requirements for current and future phased array antennas (PAAs)—an application that can benefit from time delay devices—can be daunting. As described in U.S. Pat. No. 8,995,038 entitled "Optical Time Delay Control Device" an at least partial list of some of the challenging requirements include:

Large time delay tunability: PAAs can be quite large, sometimes spanning several meters. In order to maintain uniform phase fronts of the steered radiation from these large arrays a delay tunability of up to 20 nanoseconds or possibly even larger is desired.

True time delay (TTD) operation: For high bandwidth operation an actual true-time-delay is desired. Constant phase delay devices yield undesirable squint and resonant based group velocity devices (e.g. slow light or MEMs filter approaches) limit the flexibility and/or bandwidth of the RF or microwave signal. A true time delay, realized by altering either the phase velocity (not the group velocity) or the path length, may be advantageous.

Low and constant insertion loss: Since the RF or microwave signal is inherently an analog signal, any attenuation results in an inherent reduction in the signal to noise. Furthermore, time delay dependent insertion loss may causes undesirable distortions of the PAAs radiation pattern and therefore should be minimized. A low (ideally <2 dB) and constant (variations in loss of <0.5 dB as the time delay is altered) insertion loss is desired.

Compact and highly integrable form factor: To accommodate large PAAs, which may have hundreds or even thousands of array elements, the TTD device should be compact and, importantly, highly integrable. In other words, the form-factor should enable convenient and cost-effective integration of many independent TTD channels.

Even though these design challenges are considerable, the importance of the application has motivated numerous past efforts. Examples include all electronic approaches such as MEMs RF switches, wherein the signal is selectively routed through RF micro-strips of different lengths. The switches can be extremely low loss (<0.1 dB per switch) and high bandwidth (up to 40 GHz has been demonstrated), but inherent propagation losses in the RF micro-strips prove limiting for realizing large time delays. For example in the publication Hacker, J. B., Mihailovich, R. E Kim, M., and DeNatale, J. F., "A Ka-Band 3-bit RF MEMS True-Time-Delay Network," IEEE Transactions of Microwave Theory and Techniques 51, 305-308 (2003), 2.5 dB of insertion loss was required to realize 4-bit tuning over a 20 psec range. While this performance is impressive and is certainly suited for small $\Delta T$ tuning, extending this to 8-bits and 20 nsecs is not practical; the insertion losses would be over 1000 dB.

To circumvent these transmission losses, to provide for extremely high bandwidth, and for numerous other reasons (cost, EMI immunity, size, etc.), there has been considerable past effort at realizing TTD devices in the optical domain. Briefly, the RF signal may be encoded onto a laser, this encoded laser may then be split into the desired number of channels (one channel for each array element), and each of these channels may be independently delayed with a photonic-true-time-delay (PTTD) device. After the delay is performed, and prior to each antenna array element, a high-speed photodiode may be used to convert the optical signal back into an electronic signal. While in principle this optical approach is sound, and it leverages the significant technology development realized by the telecommunications industry, in practice the key component, i.e. an ideal PTTD device, has proven elusive. This is not for lack of trying; over the past 25 years numerous approaches have included: i) optical MEMs, ii) liquid crystal spatial light modulators, iii) laser wavelength tuning designs, iv) acousto-optic schemes, and v) optical switches to direct the signal through coils of different length fibers.

Previous approaches for controllably altering an optical time delay have also included waveguide or fully integrated approaches. In these approaches, typically the optical beam is confined to a waveguide structure as it travels through the device, i.e., it is not a free propagating beam but rather a confined or guided beam. In these prior devices, integrated waveguide switches have been used to direct the beam through shorter or longer waveguide paths, thereby altering the optical transit time. The problem with these approaches has been that the waveguide losses are significant. In order to alter the optical transit time or delay over several nanoseconds, as is required, the optical path length must be changed by several feet. In these prior approaches, this necessitated travelling through many feet of waveguide, which in turn causes large optical losses (e.g., greater than 30 dB of attenuation).

U.S. Pat. No. 8,995,038 discloses an optical time delay control device that includes an optically transparent solid medium for receiving the optical beam, wherein at least a portion of the medium is generally a parallelpiped shape characterized by a height, length and width, wherein the length is larger than the height; two mirrors affixed to two opposing parallel surfaces of the optically transparent solid medium, so that during operation the optical beam reflects between the two mirrors as the optical beam travels through the optically transparent medium; and an angle actuator for controllably altering the angle at which the optical beam enters into the optically transparent medium, thereby controllably altering the time that the optical beam travels through the device. As described at col. 4, lines 48-62, the angle actuator may be implemented in various manners, and in one example is a liquid crystal waveguide beamsteerer. Alternatively, if desired, the angle actuator 16 can be implemented using traditional mechanical structures for controlling the angle of a light beam, such as galvanic mirrors, or micro electronic mechanical devices such as MEMs could be used. As shown in FIGS. 5-6, a second liquid crystal electro-optic beamsteerer may be used at the output to catch the light beam as it comes out of the device at different angles so that the light beam can be directed onto a stationary small aperture regardless of the exit angle. As shown in FIG. 7, by extending the optical path reflector to form a "window pane" hundreds of independently addressable time delay control devices or delay channels may be integrated into a single pane of silicon. In essence, an individual TTD device is "replicated" hundreds of time on the single pane of silicon.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides optical true time delay (TTD) control device for controllably altering the transit time of an optical beam traveling through the device in which the tip & tilt capability of MEMS MMAs are used to control the entrance and exit angles to a reflection cavity to coarsely control the path length and transit time and the piston capability is used to fine tune the path length and transit time.

In an embodiment, the reflection cavity comprises an optically transparent solid medium preferably including input and output circular cut-outs. The input and output MEMS MMA are positioned at the centers of the input and output circular cut-outs, respectively, such that the optical beam enters and exits the medium substantially perpendicular to the medium for all entrance angles to reduce insertion loss.

In an embodiment, opposing mirror surfaces of the reflection cavity each comprise a plurality of interior MEMS MMAs positioned to receive the optical beam and controllably alter an angle of reflection to reflect off of the next interior MEMS MMA on the opposing mirror surface. This increases the dynamic range and fine tuning of the time delay for a given form factor.

In an embodiment, the reflection cavity comprises at least four different mirrored surfaces arranged in a polygon with each surface comprising a plurality of interior MEMS MMAs positioned to receive the optical beam and controllably alter an angle of reflection to reflect off of the next interior MEMS MMA on a different mirror surface. This arrangement further increases the dynamic range and fine tuning of the time delay for a given form factor. The input and output MEMS MMA may be designated interior MEMS MMA or they may be positioned to control the entrance and exit angles to and from the polygon.

In an embodiment, the reflection cavity comprises at least six different mirrored surfaces arranged in a parallelpiped with each surface comprising a plurality of interior MEMS MMAs positioned to receive the optical beam and controllably alter an angle of reflection to reflect off of the next interior MEMS MMA on a different mirror surface. This 3D arrangement further increases the dynamic range and fine tuning of the time delay for a given form factor. The input and output MEMS MMA may be designated interior MEMS MMAs or they may be positioned to control the entrance and exit angles to and from the polygon.

In an embodiment, the input MEMS MMA is segmented into a plurality of segments each comprising one or more mirrors. Each segment is responsive to command signals to re-direct a channel optical beam to enter the reflection cavity at a specified entrance angle. The output MEMS MMA is responsive to command signals to alter the angle at which each channel optical beam leaves the reflection cavity. In one embodiment, the input optical beam is a single beam that is then split into multiple channel optical beams. The output MEMS MMA may be controlled such that the optical channel beams all leave the reflection cavity with the same exit angle or at different specified exit angles. The segments of the input MEMS MMA may include AR coatings tuned to different wavelengths to produce channel optical signals at different wavelengths. The input optical beam may comprise a plurality of optical beams at different wavelengths directed to the different segments.

These and other features and advantages of the invention will be apparent to those skilled in the art from the following detailed description of preferred embodiments, taken together with the accompanying drawings, in which:

DETAILED DESCRIPTION OF THE INVENTION

The present invention provides optical true time delay (TTD) control device for controllably alters the transit time of an optical beam traveling through the device by using the tip & tilt capability of MEMS MMAs to control the entrance and exit angles to a reflection cavity to coarsely control the path length and transit time and the piston capability to fine tune the path length and transit time. The reflection cavity can be configured in one, two or three dimensions with or without an optically transparent solid medium and using additional MEMS MMAs to provide controllable mirror surfaces within the cavity to enhance dynamic range and tenability. The input MEMS MMA may be "segmented" to re-direct a plurality of channel optical beams from the cavity at the same or different exit angles. The segments may include AR coatings at different wavelengths and/or the input optical beam providing as a plurality of beams at different wavelengths to generate channel optical signals at different wavelengths.

The optical TTD control devices of the present invention utilize the capabilities of a Micro-Electrical-Mechanical System (MEMS) Micromirror Array (MMA) comprising a plurality of independently and continuously controllable mirrors. Each mirror is capable "Tip" (rotation about an X-axis), "Tilt" (rotation about a Y-axis) and "Piston" (translation along a Z-axis, perpendicular to the XY plane) where the X, Y and Z are orthogonal axes in a three-dimensional space. Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. This MEMS MMA is currently being commercialized by Bright Silicon technologies for "digitally controlling light."

Figure 1:
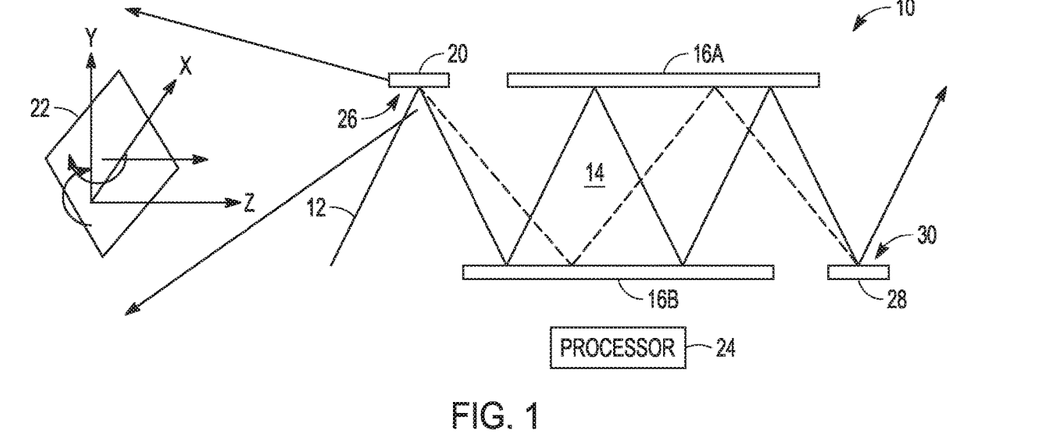
FIG. 1 is a sectional view of an embodiment of an optical true time delay (TTD) control device in which input and output TTP MEMs MMAs control mirror "tip" and "tilt" to control both the entrance and exit angles of the optical beam for coarse tuning of the path length and "piston" to provide fine tuning of the path length.

Referring now to FIG. 1, an embodiment of an optical TTD control device 10 for controllably altering the transit time of an optical beam 12 traveling through the device includes an optically transparent reflection cavity 14 for receiving the optical beam. First and second opposing mirrored surfaces 16A and 16B are provided along the walls of the reflection cavity so that during operation the optical beam 12 reflects between the mirrored surfaces as the optical beam travels a path 18 through the reflection cavity.

An input Micro-Electrical-Mechanical System (MEMS) Micromirror Array (MMA) 20 comprises a plurality of independently and continuously controllable mirrors 22 capable of rotation about an X-axis (tip), rotation about a Y-axis (tilt) and translation along a Z-axis (piston). The array is responsive to command signals from one or more processors 24 to tip and tilt each illuminated mirror about the X and Y axes to alter the entrance angle 26 at which the optical beam enters the reflection cavity to controllably alter a number of reflections off the opposing mirrored surface thereby controllably altering a path length and a transit time to travel through the reflection cavity.

An output MEMS MMA 28 comprises a plurality of independently and continuously controllable mirrors responsive to command signals to tip and tilt each illuminated mirror about the X and Y axes to alter the exit angle 30 at which the optical beam leaves the reflection cavity. The processor 24 may issue commands such the optical beam leaves the reflection cavity at the same exit angle 30 regardless of the entrance angle and path length/transit time or may alter the exit angle 30 as a function of the entrance angle or otherwise.

Generally speaking, controlling the entrance angle 26 and thus the number of reflections coarsely tunes the path length/travel time through the TTD control device 10. As will be discussed, this may be improved via different implementations of the reflection cavity. In all cases, either or both of the input and output MEMS MMAs 20 and 28 are further responsive to command signals to translate each mirror 22 along the Z axis (an axis orthogonal to the plane containing the X and Y axes) to fine tune the path length and transit time. The "piston" motion of the mirror 22 directly changes the path length by approximately twice the translation distance, this providing fine tuning of the path length. This method is much less sensitive to changes because the piston of a single device does not alter the subsequent angles in the cavity causing large changes in the time delay at the output.

Figure 2:
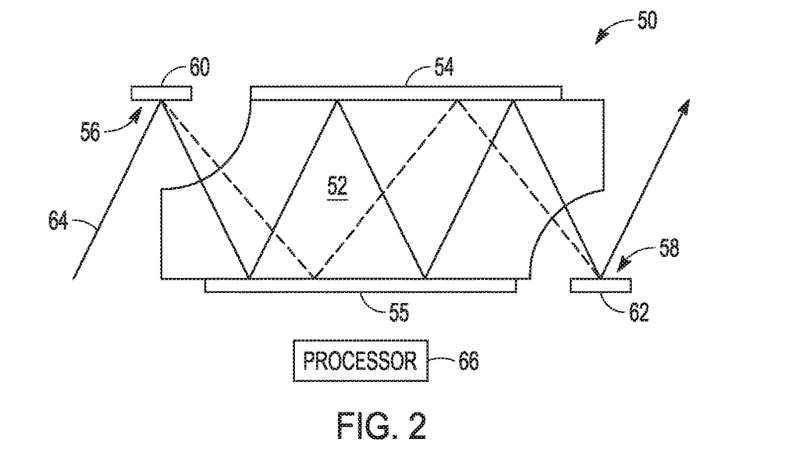
FIG. 2 is a sectional view of an embodiment of an optical true time delay (TTD) control device in which input and output TTP MEMs MMAs are positioned at the center of circular cut-outs of an optically transparent solid medium to minimize insertion losses.

Referring now to FIG. 2, an embodiment of an optical TTD control device 50 includes an optically transparent solid medium 52 positioned inside a reflection cavity 53 having opposing mirrored surfaces 54 and 55. Input and output circular cut-outs 56 and 58, respectively, are formed at the input to and output from solid medium 52. Input and output MEMS MMA 60 and 62, respectively, are positioned at the centers of the input and output circular cut-outs 56 and 58, respectively, such that an optical beam 64 enters and exits the medium substantially perpendicular to the medium for all entrance angles. Processor 66 issues the command signals to drive the input and output MEMS MMA 60 and 62 to control the entrance and exit angles, respectively. Inclusion of a solid medium allows for a larger dynamic range for tuning the path length and transit time due to the larger optical path difference caused by the higher index of refraction.

Figure 3:
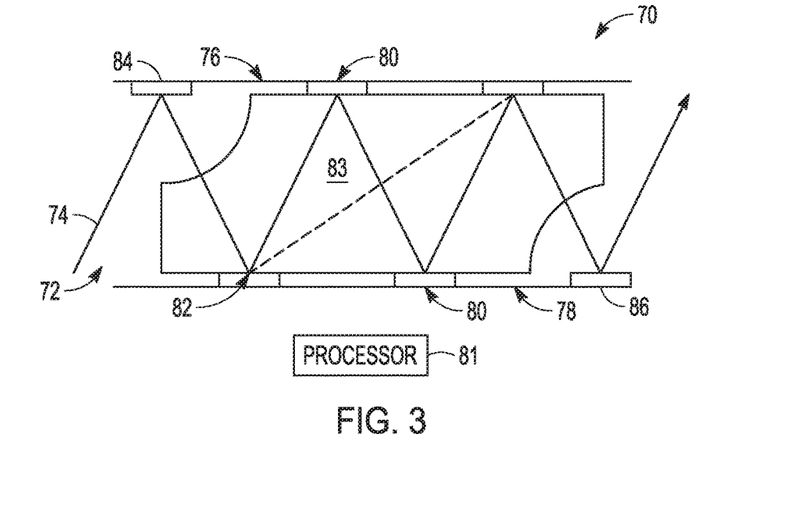
FIG. 3 is a sectional view of an embodiment of an optical true time delay (TTD) control device in which TTP MEMs MMAs line the walls of the reflection cavity to provide additional TTP control.

Referring now to FIG. 3, an embodiment of an optical TTD control device 70 includes an optically transparent reflection cavity 72 for receiving an optical beam 74. The reflection cavity has first and second opposing surfaces 76 and 78, respectively, lined with a plurality of interior MEMS MMAs 80 positioned to receive the optical beam and responsive to command signals from a processor 81 controllably alter an angle of reflection 82 to reflect off of the next interior MEMS MMA on the opposing mirror surface so that during operation the optical beam 74 reflects between the surfaces as the optical beam travels a path through the reflection cavity. This embodiment includes a solid medium 83 within the reflection cavity but it is not required.

An input MEMS MMA 84 is responsive to command signals to tip and tilt each illuminated mirror to alter the entrance angle at which the optical beam enters the reflection cavity to controllably alter a number of reflections off the interior MEMS MMAs 80 that line the opposing surfaces thereby controllably altering a path length and a transit time to travel through the reflection cavity. An output MEMS MMA 86 is responsive to command signals to tip and tilt each mirror to alter the exit angle at which the optical beam leaves the reflection cavity.

This topology in which fixed reflective surfaces have been replaced by MEMS MMAs improves the dynamic range and tunable of the TTD control device. The input, interior and output MEMS MMA minors are further responsive to command signals to translate each mirror in the Z-axis to fine tune the path length and transit time. This function can also compensate environmental variations across the device, such as thermal or vibrational.

Figure 4:
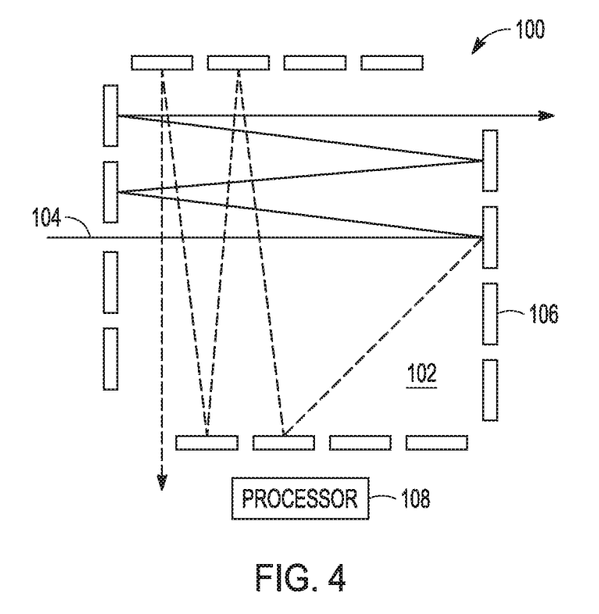
FIG. 4 is a sectional view of an embodiment of a 2D optical true time delay (TTD) control device in which a plurality of TTP MEMs MMAs line the walls of a polygon to provide path length tuning in a compact form factor.

Referring now to FIG. 4, an embodiment of an optical TTD control device 100 includes an optically transparent reflection cavity 102 for receiving an optical beam 104. The cavity 102 has the general shape of a two-dimensional polygon in which each straight-line segment (surface) is lined with interior MEMS MMAs 106. In this example, the polygon is a square having four opposing surfaces. The interior MEMS MMAs are positioned to receive the optical beam and responsive to command signals from a processor 108 controllably alter an angle of reflection to reflect off of the next interior MEMS MMA on a different mirror surface.

Either one of the interior MEMS MMAs is designated as the input MEMS MMA and one of the interior MEMS MMAs is designated as the output MEMS MMA or the input and output MEMS MMAs are separate devices configured to alter the entrance and exits angles of the optical beam to and from the polygon of MEMS MMAs. Each, all or a subset of the MEMS MMAs may be responsive to command signals to translate mirrors along the Z-axis to fine tune the path length/transit time of the optical beam 104. This configuration further improves the tuning capability and dynamic range of the TTD control device.

Figure 5:
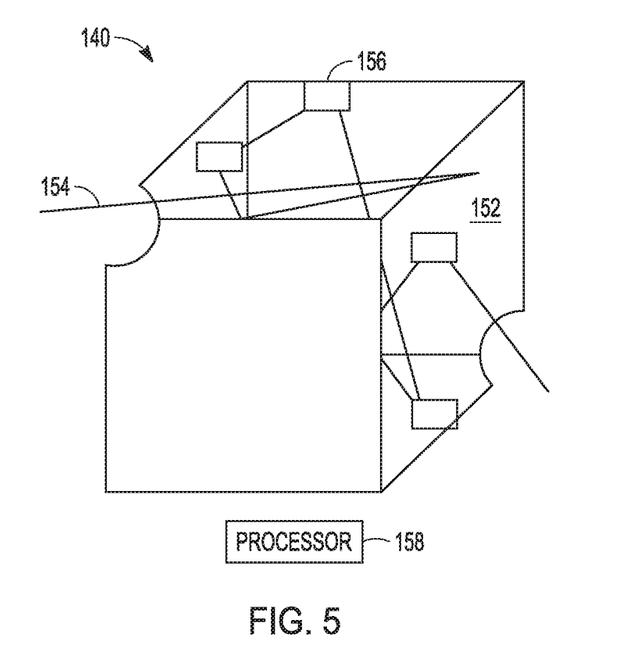
FIG. 5 is a view of an embodiment of a 3D optical true time delay (TTD) control device in which a plurality of TTP MEMS MMAs line the walls of a parallelpiped to provide path length tuning in a compact form factor.

Referring now to FIG. 5, an embodiment of an optical TTD control device 150 includes an optically transparent reflection cavity 152 for receiving an optical beam 154. The cavity 152 has the general shape of a three-dimensional parallelpiped in which each straight-line segment (surface) is lined with interior MEMS MMAs 156. In this example, the parallelpiped is a cube having six opposing surfaces. The interior MEMS MMAs are positioned to receive the optical beam and responsive to command signals from a processor 158 controllably alter an angle of reflection to reflect off of the next interior MEMS MMA on a different mirror surface. Either one of the interior MEMS MMAs is designated as the input MEMS MMA and one of the interior MEMS MMAs is designated as the output MEMS MMA or the input and output MEMS MMAs are separate devices configured to alter the entrance and exits angles of the optical beam to and from the polygon of MEMS MMAs. Each, all or a subset of the MEMS MMAs may be responsive to command signals to translate mirrors along the Z-axis to fine tune the path length/transit time of the optical beam 154. This configuration further improves the tuning capability and dynamic range of the TTD control device.

Either the 2D or 3D configurations of FIGS. 4 and 5 may be provided with an optically transparent solid medium.

Referring now to FIGS. 6A through 6D, plots show the time delay possible as a function of the input MEMS MMA tilt angle theta. Certain angles of steering do not produce allowable states (the light does not exit the cavity), and as such there are regions of discontinuity (scanning gaps) in the plot. As the mirror scans angle in one direction, the time delay reaches some minimum value t_min for that given angle (Θmin). In this scenario, the light makes a minimum number of bounces through the cavity (only one or two, depending on orientation). In this area there are large zones of allowable and unallowable states. As the mirror scans the other direction, the number of bounces within the cavity increases, and so does the time delay. As the angle increases, the width of both the allowable and un-allowable states decrease. At some angle, (Θmax) the time delay reaches maximum value t_max. Any further angle steering beyond this angle will not result in a larger time delay, but rather an unallowable state (perhaps the light never enters the cavity because the redirection angle is too steep).

Figure 6A:
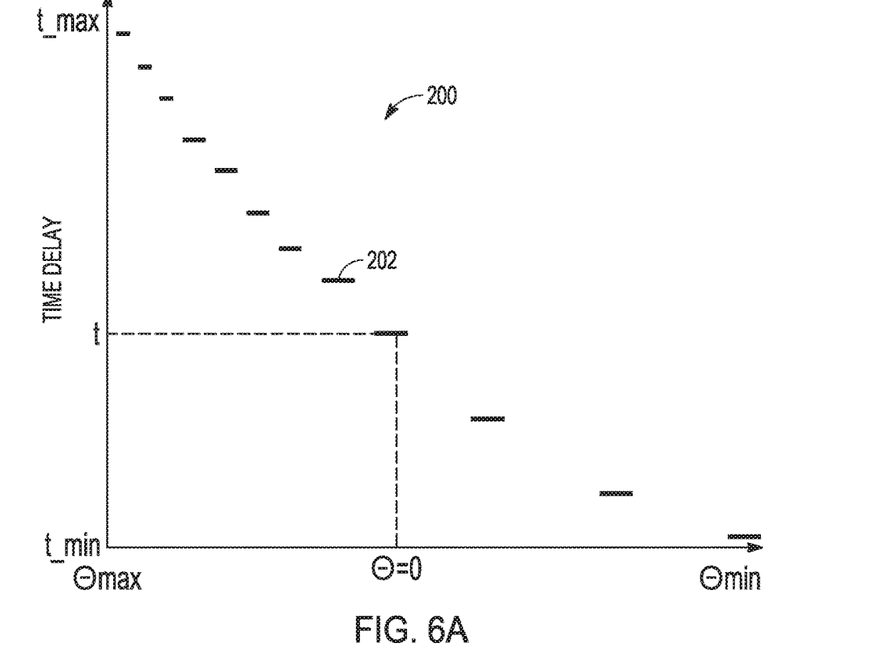
FIGS. 6A through 6D are plots plot showing the time delay possible as a function of the input MMA tilt angle theta for a simple 1D cavity, a 1D cavity with "piston" control of the input and output MEMS MMA, 1D cavity lined with MEMS MMAs and for 2D and 3D reflection cavities.
Figure 6B:
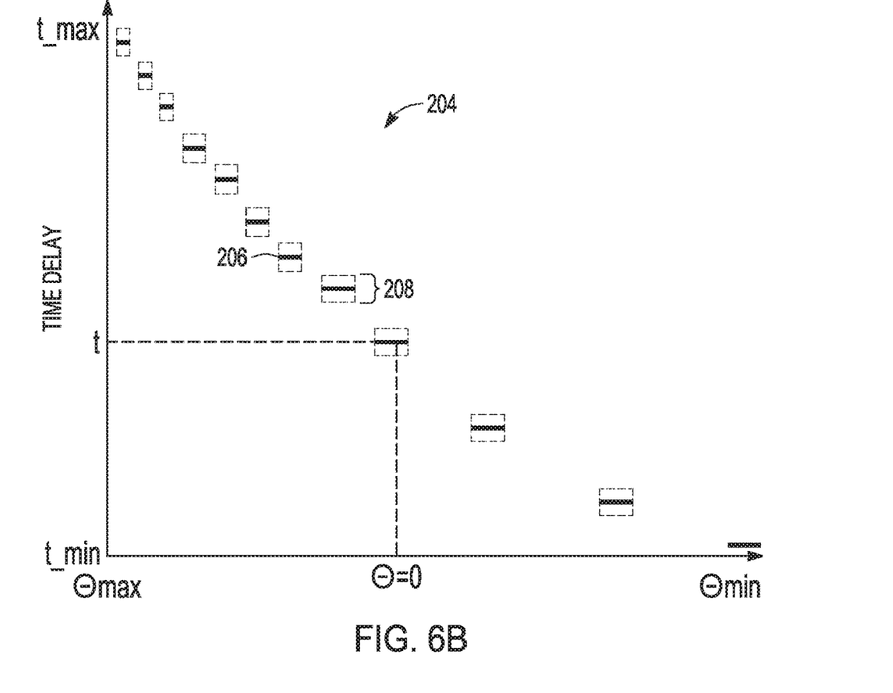

FIG. 6A plot 200 shows the time delay as a function of the entrance angle 202 for the embodiment shown in FIG. 1 or 2 using only control of the entrance angle to vary the path length and transit time. The inclusion of the solid medium increases the dynamic range but the zones of allowable and unallowable states would be similar. FIG. 6B plot 204 shows the same time delays possible when piston control is added to the input MMA, In this case, each valid steeling angle from 206 has some additional variability 208 on the time delay it can produce. The piston capability increases the delay length before and after the cavity, but not the value delayed by the cavity itself, effectively adding the ability to fine tune the time delay at each step.

Figure 6C:
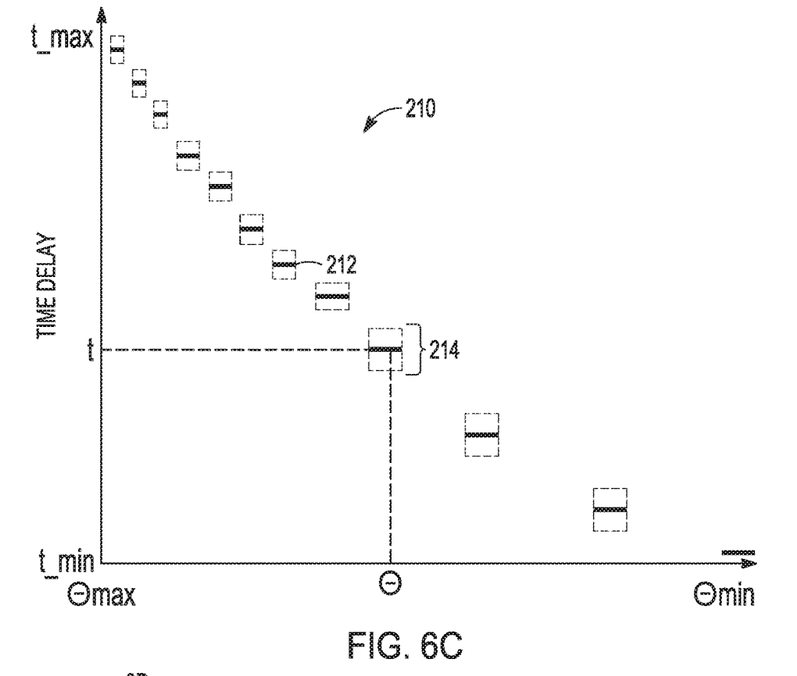

FIG. 6C plot 210 shows the same time delays possible when piston control is added to the interior MEMS MMAs that line the walls of the reflection cavity as shown in FIG. 3. Each valid steering angle 212 has some additional variability 214 on the time delay it can produce using the piston capability of the input, interior and output MEMS MMAs. In this case, the additional interior MEMS MMAs further increase the amount of variability that is attainable.

Figure 6D:
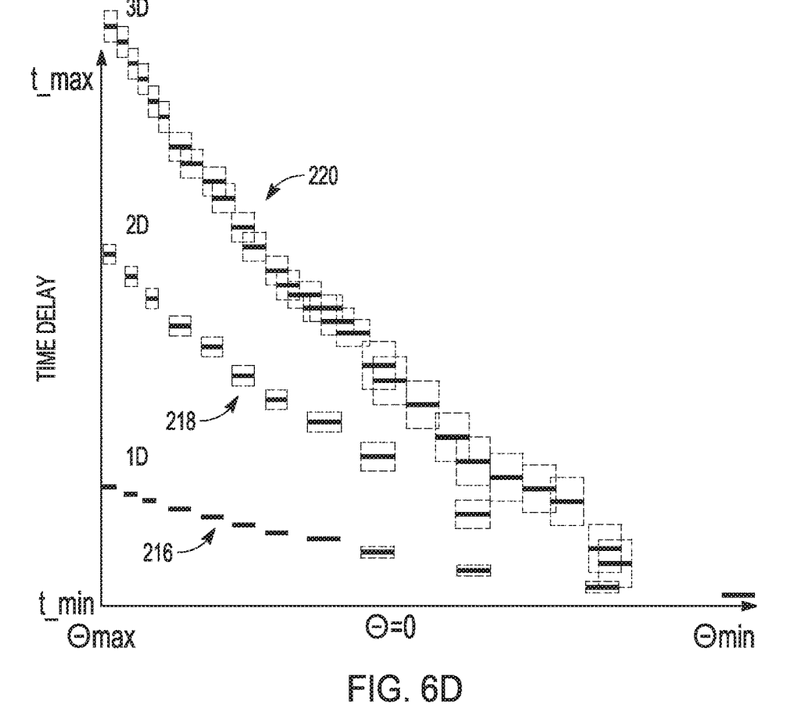

FIG. 6D plot 216, 218 and 220 show the same time delays possible as the reflection cavity scales up in dimensionality. The plot 218 for a 1D case is generally speaking the cases described in FIGS. 6A, 6B and 6C. By adding additional MEMS MMAs to the cavity to make a 2D structure, the time delay achievable increases significantly and the density of allowable states increase as shown in plot 218. Further adding MEMS MMAs to the cavity to create a 3D cavity sees additional gains in the achievable time delays and the density of allowable states increases to a potentially continuous solution as shown in plot 220, Piston control on both the 2D and 3D case add further fine tuning to the time delay on any allowable state.

Figure 7A:
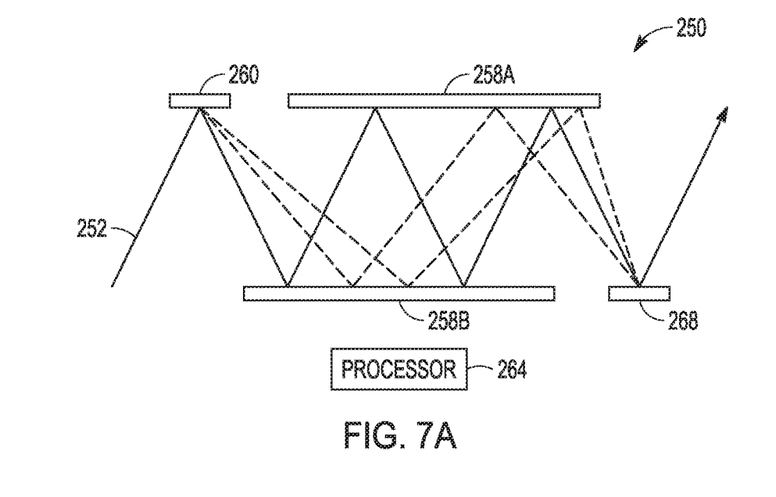
FIGS. 7A-7C are sectional and zoomed in section views of an embodiment of a multi-channel optical (TTD) control device in which input and output TTP MEMs MMAs control the path length and time delay to create multiple channel optical beam with a common reflection cavity and common MEMs MMAs from a single input optical beam.
Figure 7B:
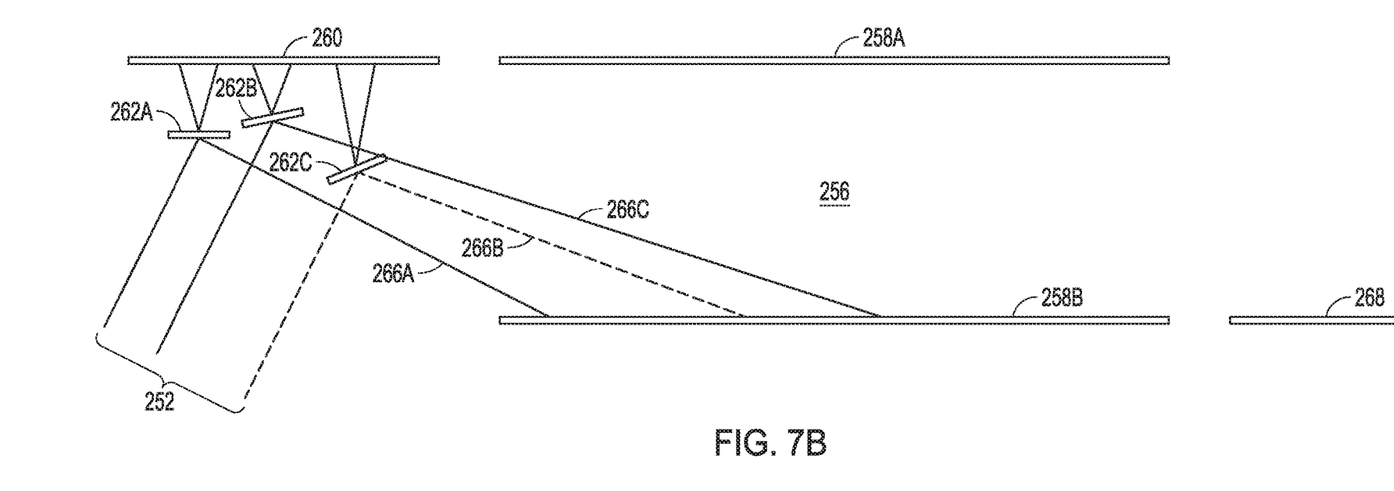
Figure 7C:
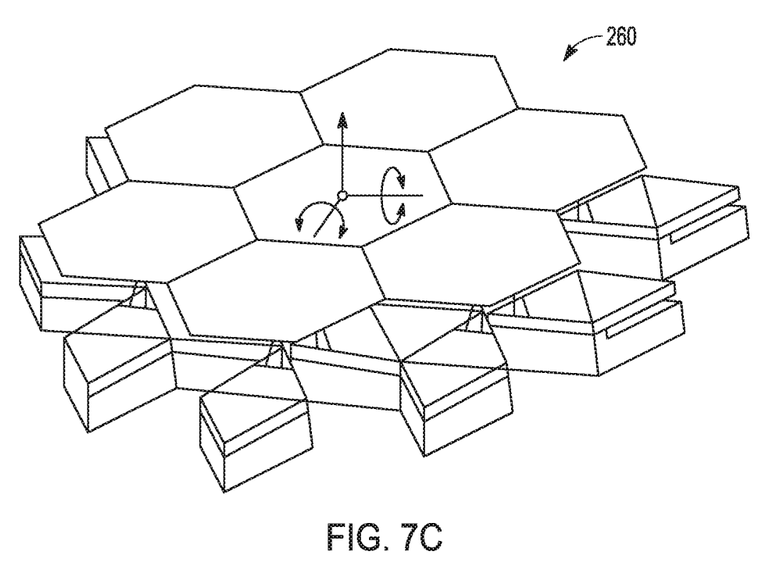

Referring now to FIGS. 7A through 7C, an optical true time delay (TTD) control device 250 generates from a single input optical beam 252 a plurality of channel optical beams 254 and controllably alters the transit time of each channel optical beam 266A, 266B, 266C traveling through the device. The device includes an optically transparent reflection cavity 256 and first and second opposing mirrored surfaces 258A and 258B.

An input MEMS MMA 260 comprises a plurality of independently and continuously controllable mirrors 262A, 262B, 262C responsive to command signals from a processor 264 to segment the array into a plurality of segments each comprising one or more mirrors and within each segment to tip and tilt each mirror about first and second orthogonal axes to alter the angle at which a channel optical beam 266A, 266B, 266C enters the reflection cavity to controllably alter a number of reflections off the opposing mirrored surface thereby controllably altering a path length and a transit time for each channel optical beam 266A, 266B, 266C to travel through the reflection cavity. For simplicity, in this example each "segment" is a single mirror. Each segment may be coated with an AR coating having a different wavelength to generate channel optical beams at different wavelengths. The single input optical beam could be a plurality of wavelength specific narrowband optical beams tuned to the AR coatings and directed to the respective segments of input MEMs MMA.

An output MEMS MMA 268 comprises a plurality of independently and continuously controllable mirrors responsive to command signals from processor 264 to tip and tilt each mirror about first and second orthogonal axes to alter the angle at which the channel optical beams 266A, 266B, 266C leave the reflection cavity. In different embodiments, the output MEMS MMA may be controlled such that all of the channel optical beams leave the reflection cavity with the same exit angle. Alternately, the channel optical beams may leave the reflection cavity at different specified exit angles.

In a multi-channel configuration, processor 264 must control the input MEMS MMA (and any interior MEMS MMAs) such that multiple optical channel beams do hit the same spot on the output MEMS MMA at the same time while requiring different deflections to achieve the desired exit angle.

The input and output MEMS MMAs 260 and 268 are further responsive to command signals to translate each mirror in the Z-axis to fine tune the path length and transit time.

The multi-channel topologies can be configured with an optically transparent solid medium, with mirror surfaces or lined with interior MEMS MMAs, or as 2 or 3-D configurations as previously described.

In each of the topologies, a beam may be re-directed by a plurality of micromirrors. Those mirrors may be controlled to impart the same angle redirection to the beam and the same path length correction or they may be controlled to vary the tip/tilt and piston across the wavefront, either incident on the entire MMA or a particular segment. Varying the tip/tilt and/or piston may be used to create multiple propagating beams within the cavity such that the angle across the plurality of micromirrors changes across the aperture. Each propagating beam will have a different time delay based on the angle entering the cavity.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical true time delay (TTD) control device for controllably altering the transit time of an optical beam traveling through the device, the device comprising:
  an optically transparent reflection cavity for receiving the optical beam;
  first and second opposing mirrored surfaces on the reflection cavity so that during operation the optical beam reflects between the mirrored surfaces as the optical beam travels a path through the reflection cavity;
  an input Micro-Electrical-Mechanical System (MEMS) Micromirror Array (MMA) comprising a plurality of independently and continuously controllable mirrors responsive to command signals to tip and tilt each illuminated mirror about first and second orthogonal axes to alter an entrance angle at which the optical beam enters the reflection cavity to controllably alter a number of reflections off the opposing mirrored surface thereby controllably altering a path length and a transit time to travel through the reflection cavity; and
  an output MEMS MMA comprising a plurality of independently and continuously controllable mirrors responsive to command signals to tip and tilt each illuminated mirror about first and second orthogonal axes to alter an exit angle at which the optical beam leaves the reflection cavity,
  wherein said input and output MEMS MMA mirrors are further responsive to command signals to translate each illuminated mirror in a third axis orthogonal to the plane containing the first and second orthogonal axis to fine tune the path length and transit time.

2. The optical TTD control device of claim 1, wherein said output MEMS MMA is responsive to command signals such that the optical beam leaves the reflection cavity with the same specified exit angle for all entrance angles.

3. The optical TTD control device of claim 1, wherein the reflection cavity comprises an optically transparent solid medium including input and output circular cut-outs, wherein said input and output MEMS MMA are positioned at the centers of the input and output circular cut-outs, respectively, such that the optical beam enters and exits the medium substantially perpendicular to the medium for all entrance angles.

4. The optical TTD control device of claim 1, wherein said first and second opposing mirror surfaces each comprise a plurality of interior MEMS MMAs positioned to receive the optical beam and controllably alter an angle of reflection to reflect off of the next interior MEMS MMA on the opposing mirror surface.

5. The optical TTD control device of claim 1, wherein said reflection cavity further comprises at least third and fourth opposing mirrored surfaces, wherein said first, second, third and fourth opposing mirrored surfaces are arranged in a polygon with each surface comprising a plurality of interior MEMS MMAs positioned to receive the optical beam and controllably alter an angle of reflection to reflect off of the next interior MEMS MMA on a different mirror surface.

6. The optical TTD control device of claim 5, wherein either one of the interior MEMS MMAs is designated as the input MEMS MMA and one of the interior MEMS MMAs is designated as the output MEMS MMA or the input and output MEMS MMAs are separate devices configured to alter the entrance and exits angles of the optical beam to and from the polygon of MEMS MMAs.

7. The optical TTD control device of claim 1, wherein said reflection cavity further comprises at least third and fourth and fifth and sixth opposing mirrored surfaces, wherein said first, second, third, fourth, fifth and sixth opposing mirrored surfaces are arranged in a parallelpiped with each surface comprising a plurality of interior MEMS MMAs positioned to receive the optical beam and controllably alter an angle of reflection to reflect off of the next interior MEMS MMA on a different minor surface.

8. The optical TTD control device of claim 7, wherein either one of the interior MEMS MMAs is designated as the input MEMS MMA and one of the interior MEMS MMAs is designated as the output MEMS MMA or the input and output MEMS MMAs are separate devices configured to alter the entrance and exits angles of the optical beam to and from the parallelpiped of MEMS MMAs.

9. The optical TTD control device of claim 1, further comprising:
  one or more processors configured to generate command signals to segment the input MEMS MMA into a plurality of segments each comprising one or more mirrors, each said segment responsive to command signals to re-direct a channel optical beam to enter the reflection cavity at a specified entrance angle, said output MEMS MMA responsive to command signals to alter the angle at which each channel optical beam leaves the reflection cavity.

10. The optical TTD control device of claim 9, wherein said optical beam is a single beam, wherein said TTD control device generates multiple channel optical beams with controlled time delays.

11. The optical TTD control device of claim 10, wherein the one or more processors generate command signals for the output MEMS MMA such each said channel optical beam leaves the reflection cavity at the same exit angle.

12. The optical TTD control device of claim 10, wherein the one or more processors generate command signals for the output MEMS MMA such each channel optical beams leaves the reflection cavity at different specified exit angles.

13. The optical TTD control device of claim 10, wherein each segment of one or more mirrors includes an anti-reflection (AR) coating tuned to a different wavelength.

14. The optical TTD control device of claim 9, wherein said optical beam comprises a plurality of channel optical beams at different wavelengths each directed to a different segment of the MEMS MMA.

15. An optical true time delay (TTD) control device for controllably altering the transit time of an optical beam traveling through the device, the device comprising:
- an optically transparent reflection cavity for receiving the optical beam;
- first and second opposing surfaces on the reflection cavity, each surface comprising a plurality of interior Micro-Electrical-Mechanical System (MEMS) Micromirror Array (MMAs) comprising a plurality of independently and continuously controllable mirrors responsive to command signals to tip and tilt each illuminated mirror about first and second orthogonal axes to controllably alter an angle of reflection to reflect off of the next interior MEMS MMA on the opposing mirror surface so that during operation the optical beam reflects between the surfaces as the optical beam travels a path through the reflection cavity;
- an input Micro-Electrical-Mechanical System (MEMS) Micromirror Array (MMA) comprising a plurality of independently and continuously controllable mirrors responsive to command signals to tip and tilt each illuminated mirror about first and second orthogonal axes to alter an entrance angle at which the optical beam enters the reflection cavity to controllably alter a number of reflections off the interior MEMS MMMs that line the opposing surfaces thereby controllably altering a path length and a transit time to travel through the reflection cavity; and
- an output MEMS MMA comprising a plurality of independently and continuously controllable mirrors responsive to command signals to tip and tilt each illuminated mirror about first and second orthogonal axes to alter an exit angle at which the optical beam leaves the reflection cavity,
- wherein said input, output and interior MEMS MMA mirrors are further responsive to command signals to translate each illuminated mirror in a third axis orthogonal to the plane containing the first and second orthogonal axis to fine tune the path length and transit time.

16. The optical TTD control device of claim 15, wherein the reflection cavity comprises an optically transparent solid medium including input and output circular cut-outs, wherein said input and output MEMS MMA are positioned at the centers of the input and output circular cut-outs, respectively, such that the optical beam enters and exits the medium substantially perpendicular to the medium for all entrance angles, wherein said interior MEMS MMA are positioned adjacent the optically transparent solid medium.

17. An optical true time delay (TTD) control device for controllably altering the transit time of an optical beam traveling through the device, the device comprising:
- an optically transparent reflection cavity for receiving the optical beam;
- first and second opposing mirrored surfaces on the reflection cavity;
- an input Micro-Electrical-Mechanical System (MEMS) Micromirror Array (MMA) comprising a plurality of independently and continuously controllable mirrors responsive to command signals to segment the array into a plurality of segments each comprising one or more mirrors and within each segment to tip and tilt each illuminated mirror about first and second orthogonal axes to alter an entrance angle at which a channel optical beam enters the reflection cavity to controllably alter a number of reflections off the opposing mirrored surface thereby controllably altering a path length and a transit time through the reflection cavity for each channel optical beam to travel through the reflection cavity; and
- an output MEMS MMA comprising a plurality of independently and continuously controllable mirrors responsive to command signals to tip and tilt each illuminated mirror about first and second orthogonal axes to alter an exit angle at which each channel optical beam leaves the reflection cavity,
- wherein said input and output MEMS MMA mirrors are further responsive to command signals to translate each illuminated mirror in a third axis orthogonal to the plane containing the first and second orthogonal axis to fine tune the path length and transit time.

18. The optical TTD control device of claim 17, wherein said optical beam is a single beam, wherein said TTD control device generates multiple channel optical beams with controlled time delays.

19. The optical TTD control device of claim 17, wherein the one or more processors generate command signals for the output MEMS MMA such each said channel optical beam leaves the reflection cavity at the same exit angle.

20. The optical TTD control device of claim 17, wherein the one or more processors generate command signals for the output MEMS MMA such each channel optical beams leaves the reflection cavity at different specified exit angles.

* * * * *

UNITED STATES PATENT AND TRADEMARK OFFICE
CERTIFICATE OF CORRECTION

PATENT NO. : 11,539,131 B2
APPLICATION NO. : 17/001125
DATED : December 27, 2022
INVENTOR(S) : Uyeno et al.

Page 1 of 2

It is certified that error appears in the above-identified patent and that said Letters Patent is hereby corrected as shown below:

On the Title Page

In item (54), in "Title", in Column 1, Line 3, delete "MICROELECTRICAL-MECHANICAL" and insert --MICRO-ELECTRICAL-MECHANICAL-- therefor In the Drawings Sheet 2 of 6, Fig. 5, reference numeral 140, Line 1, delete "140" and insert --150-- therefor In the Specification In Column 1, Line 3, delete "MICROELECTRICAL-MECHANICAL" and insert --MICRO-ELECTRICAL-MECHANICAL-- therefor In Column 1, Line 3, delete "MEMS" and insert --MEMs-- therefor In Column 2, Line 1, delete "R. E" and insert --R. E.,-- therefor In Column 3, Line 53, delete "MMA" and insert --MMAs-- therefor In Column 4, Line 44, delete "MEMS" and insert --MEMs-- therefor In Column 6, Line 52, delete "minors" and insert --mirrors-- therefor In Column 7, Line 62, delete "MMA," and insert --MMA.-- therefor In Column 7, Line 62, delete "steeling" and insert --steering-- therefor In Column 8, Line 20, delete "220," and insert --220.-- therefor Signed and Sealed this
Eighth Day of October, 2024

Katherine Kelly Vidal
*Director of the United States Patent and Trademark Office*

CERTIFICATE OF CORRECTION (continued)
U.S. Pat. No. 11,539,131 B2

In the Claims

In Column 9, Line 42, in Claim 1, delete "minor" and insert --mirror-- therefor

In Column 10, Line 34, in Claim 7, delete "minor" and insert --mirror-- therefor In Column 11, Line 29, in Claim 15, delete "MMMs" and insert --MMAs-- therefor